(12) United States Patent
Jiang et al.

(10) Patent No.: US 10,438,038 B2
(45) Date of Patent: Oct. 8, 2019

(54) DECODING METHOD AND SYSTEM FOR QR CODE WITH ONE DAMAGED POSITION DETECTION PATTERN

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 0 days.

(21) Appl. No.: 15/895,199

(22) Filed: Feb. 13, 2018

(65) Prior Publication Data
US 2018/0165492 A1 Jun. 14, 2018

Related U.S. Application Data

(63) Continuation of application No. PCT/CN2016/091971, filed on Jul. 28, 2016.

(30) Foreign Application Priority Data

Sep. 2, 2015 (CN) .......................... 2015 1 0553171

(51) Int. Cl.
*G06K 7/14* (2006.01)
*G06K 7/10* (2006.01)

(52) U.S. Cl.
CPC ............. *G06K 7/1417* (2013.01); *G06K 7/10* (2013.01); *G06K 7/14* (2013.01); *G06K 7/1456* (2013.01)

(58) Field of Classification Search
CPC .......... G06K 7/10; G06K 7/14; G06K 7/1417; G06K 7/1456
(Continued)

(56) References Cited

U.S. PATENT DOCUMENTS 6,606,396 B1 * 8/2003 Ishibashi .................. G06K 7/14
283/72
8,061,615 B2 * 11/2011 Yada ..................... G06K 7/1456
235/462.08
(Continued)

FOREIGN PATENT DOCUMENTS

| CN | 1959704 A | 5/2007 |
| CN | 104463059 A | 3/2015 |
| CN | 104809422 | 7/2015 |

*Primary Examiner* — Seung H Lee (57) ABSTRACT

The invention provides a decoding method and system for a QR code with one damaged position detection pattern. The decoding method comprises the steps: binarizing a received image containing a QR code pattern and searching for position detection patterns, decoding the QR code pattern through the following method if two position detection patterns are searched out, recording the linear equations of the boundaries of the two position detection patterns and the vertex coordinates of the two position detection patterns and calculating the data bit width of the QR code pattern, searching out a location pattern between the two position detection patterns with the positional relation determined, determining the region where the QR code pattern is located according to the two position detection patterns and the location pattern, partitioning the region where the QR code pattern is located with grids, and decoding the QR code pattern partitioned with grids.

8 Claims, 6 Drawing Sheets

(58) Field of Classification Search
USPC .................................................... 235/462.1
See application file for complete search history.

(56) References Cited

U.S. PATENT DOCUMENTS

| | | | | |
|---|---|---|---|---|
| 8,130,407 | B2* | 3/2012 | Nose | G06K 1/121 |
| | | | | 235/462.09 |
| 8,515,162 | B2* | 8/2013 | Cheng | G06K 19/06037 |
| | | | | 235/462.01 |
| 8,881,985 | B2* | 11/2014 | Gassler | G06K 7/1491 |
| | | | | 235/462.01 |
| 9,594,993 | B2* | 3/2017 | Picard | G06K 7/1417 |
| 2004/0020989 | A1* | 2/2004 | Muramatsu | G06K 19/06037 |
| | | | | 235/462.1 |
| 2005/0199721 | A1* | 9/2005 | Chang | G06K 7/1417 |
| | | | | 235/462.1 |
| 2010/0155464 | A1* | 6/2010 | Swayn | G06K 7/14 |
| | | | | 235/375 |
| 2013/0153662 | A1* | 6/2013 | Narasa Prakash | G06K 7/1486 |
| | | | | 235/462.07 |
| 2014/0263652 | A1* | 9/2014 | Auger | G06K 7/1491 |
| | | | | 235/462.12 |

* cited by examiner

DECODING METHOD AND SYSTEM FOR QR CODE WITH ONE DAMAGED POSITION DETECTION PATTERN

CROSS REFERENCE TO RELATED APPLICATIONS

The present application is a Continuation Application of PCT Application No. PCT/CN2016/091971 filed on Jul. 28, 2016, which claims the benefit of Chinese Patent Application No. 201510553171.1 filed on Sep. 2, 2015. All the above are hereby incorporated by reference.

TECHNICAL FIELD

The invention relates to the technical field of QR codes, in particular to a decoding method and system for a QR code with one damaged position detection pattern.

DESCRIPTION OF RELATED ART

Figure 1:
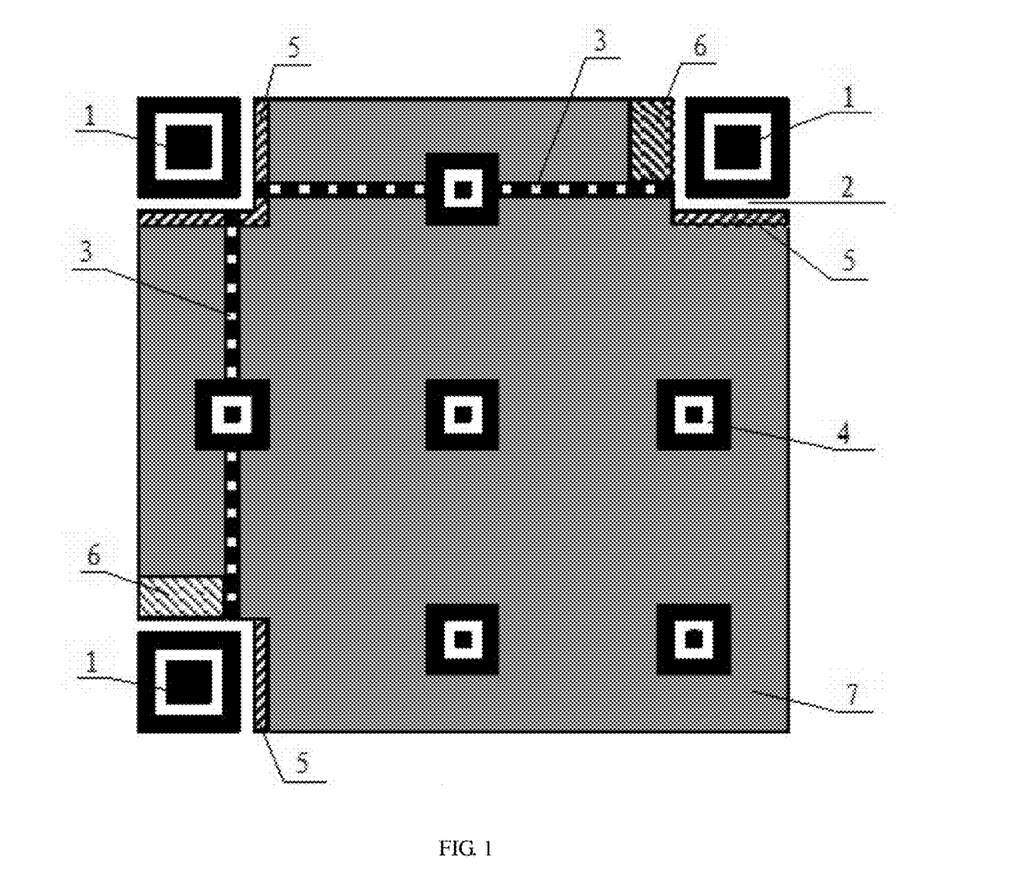
FIG. 1 is a structural diagram of a functional region and a coding region of a QR code.

QR codes are used more and more widely, and QR code images can be damaged under environmental influences. As a QR code intrinsically includes a functional region and a coding region, information of a QR code image can still be recovered and recognized by means of certain characteristics of the functional region when the QR code is damaged to a certain extent. As is shown in FIG. 1, the functional region of the QR code includes position detection patterns (1), position detection pattern separators (2), location patterns (3) and correction patterns (4), and the coding region of the QR code includes format information patterns (5), version information patterns (6) and a data information pattern (7). Location of the QR code is realized generally through recognition of the three position detection patterns; however, if the position detection patterns are damaged, the QR code cannot be located through a conventional method anymore.

The Chinese invention patent with the publication No. CN104463059A discloses a reconstruction method for a QR code with one damaged detection pattern. As for the reconstruction method, a third detection pattern is recovered and reconstructed based on the other two detection patterns and a location pattern at the lower right corner of a standard QR code pattern, three squares are reconstructed in the reconstruction process, but only one square is relatively matched with the actual pattern, and thus the reconstruction method has certain redundancy. Furthermore, in the application document, the location pattern at the lower right corner is actually a correction pattern, sometimes, more than one pattern identical with the location pattern at the lower right corner exists in the QR code image, and thus by adoption of the reconstruction method, the process is complex, and reconstruction efficiency is low.

Technical Problems

To solve the above technical problems, the invention provides a decoding method and system for a QR code with one damaged position detection pattern, which is high in efficiency and low in error.

Solution to Problems

Technical Solution

The technical scheme adopted by the invention to solve the above technical problems:

A decoding method for a QR code with one damaged position detection pattern comprises the following steps:

binarizing a received image containing a QR code pattern and searching for position detection patterns;

decoding the QR code pattern through the following method if two position detection patterns are searched out;

recording the linear equations of the boundaries of the two position detection patterns and the vertex coordinates of the two position detection patterns and calculating the data bit width of the QR code pattern;

judging whether the two position detection patterns are in an adjacent positional relation or a diagonal positional relation according to the geometrical relation between the boundaries and the vertexes of the two position detection patterns;

searching out a location pattern between the two position detection patterns with the positional relation determined according to the positional relation of the two position detection patterns and the position characteristic and the black and white pattern characteristic of the location pattern;

determining the region where the QR code pattern is located according to the two position detection patterns and the location pattern;

partitioning the region where the QR code pattern is located with grids according to the two position detection patterns, the location pattern and the data bit width of the QR code pattern;

decoding the QR code pattern partitioned with grids.

Beneficial effects of the invention: the positional relation of the two searched-out position detection patterns is judged according to the geometrical relation between the boundaries and vertexes of the two position detection patterns, the region where the QR code pattern is located and the rotation angle of the QR code pattern are determined through the functional pattern, namely the location pattern, and then the region where the damaged position detection pattern is located can also be directly deduced, so that the QR code recognition method is direct, and efficiency is high; and the QR code pattern is partitioned with grids according to black and white boundaries on the location pattern and the position detection patterns, and thus the QR code decoding error is low.

A decoding system for a QR code with one damaged position detection pattern is characterized by comprising a binarization module, a first searching module, a recording module, a judgment module, a second searching module, a determination module, a grid partition module and a decoding module, wherein, the binarization module is used for binarizing a received image containing a QR code pattern;

the first searching module is used for searching the received image containing the QR code pattern for position detection patterns;

the recording module is used for recording the linear equations of the boundaries of the two position detection patterns and the vertex coordinates of the two position detection patterns and calculating the data bit width of the QR code pattern;

the judgment module is used for judging whether the two position detection patterns are in an adjacent positional relation or a diagonal positional relation according to the geometrical relation between the boundaries and the vertexes of the two position detection patterns;

the second searching module is used for searching out a location pattern between the two position detection patterns with the positional relation determined according to the positional relation of the two position detection patterns and the position characteristic and the black and white pattern characteristic of the location pattern;

the determination module is used for determining the region where the QR code pattern is located according to the two position detection patterns and the location pattern;

the grid partition module is used for partitioning the region where the QR code pattern is located with grids according to the two position detection patterns, the location pattern and the data bit width of the QR code pattern;

the decoding module is used for decoding the QR code pattern partitioned with grids.

Beneficial Effects of the Invention

Beneficial Effects

Beneficial effects of the invention: the position detection patterns in the received image containing the QR code pattern are searched out through the binarization module and the first searching module, the region where the QR code pattern is located is determined through the recording module, the judgment module, the second searching module and the determination module based on the two position detection patterns, the region where the QR code pattern is located is partitioned with grids through the grid partition module, and the QR code pattern is decoded through the decoding module, so that the decoding system is reasonable in structure, the QR code pattern with one damaged position detection pattern can be decoded efficiently, and errors are low.

DESCRIPTION OF REFERENCE SIGNS

1, position detection pattern; 2, position detection pattern separator; 3, location pattern; 4, correction pattern; 5, format information pattern; 6, version information pattern; 7, data information pattern;

11, binarization module; 12, first searching module; 13, recording module; 14, judgment module; 15, second searching module; 16, determination module; 17, grid partition module; 18, decoding module;

19, possible location pattern region.

EMBODIMENTS OF THE INVENTION

Detailed Description of the Invention

The key concept of the invention: by means of the characteristics that location patterns are located between position detection patterns, have the width of one data bit width and are provided with continuous black and white points each occupying one data bit width, the region where a QR code pattern is located is determined through the two position detection patterns according to the geometrical relation, so that QR code pattern recognition efficiency is high, and errors are low.

Detailed Description of the Invention

Figure 2:
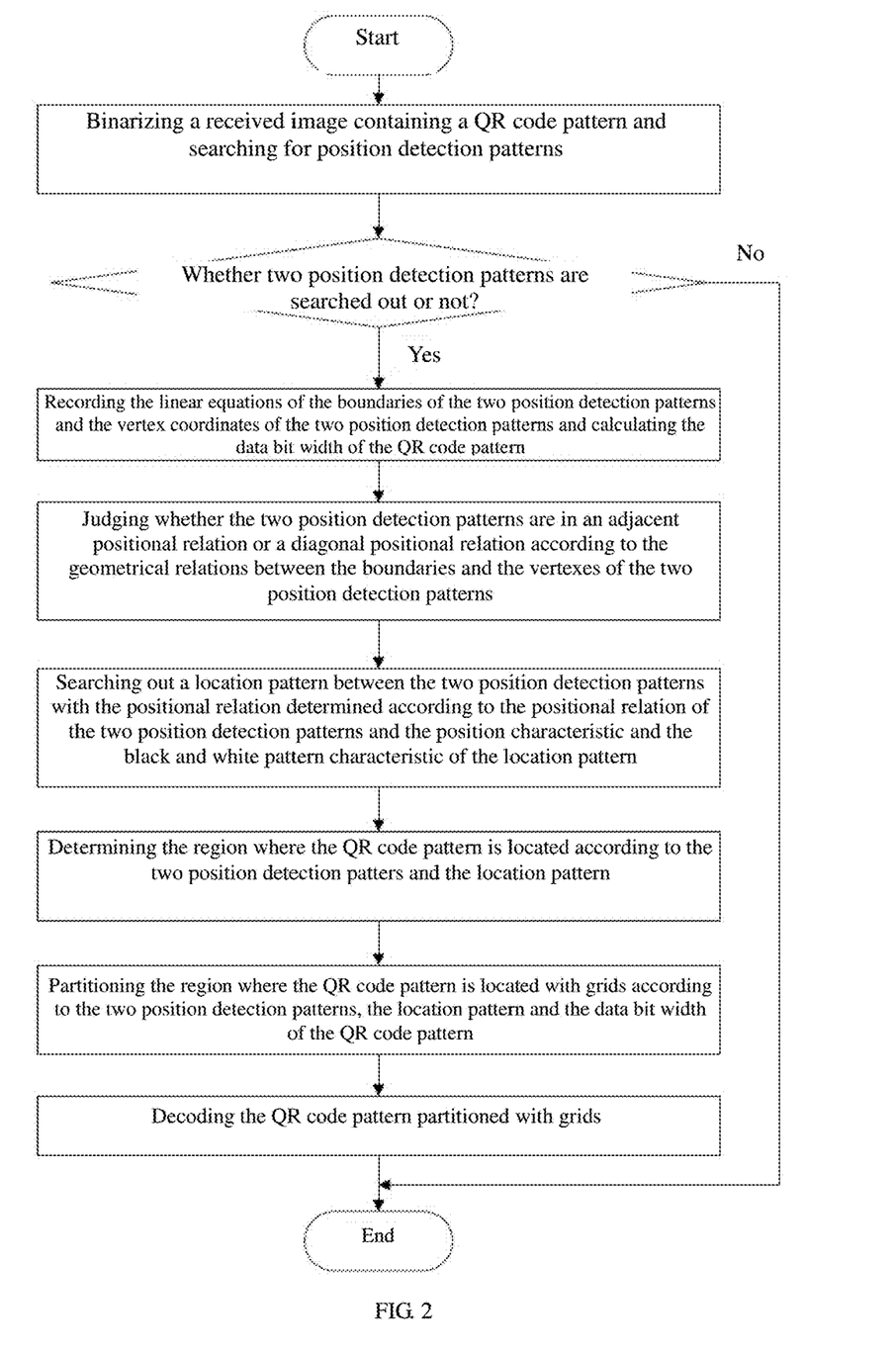
FIG. 2 is a flow diagram of a decoding method for a QR code with one damaged position detection pattern in the first embodiment and the second embodiment of the invention.

As is shown in FIGS. 1-9, a decoding method for a QR code with one damaged position detection pattern comprises the following steps:

binarizing a received image containing a QR code pattern and searching for position detection patterns;

decoding the QR code pattern through the following method if two position detection patterns are searched out;

recording the linear equations of the boundaries of the two position detection patterns and the vertex coordinates of the two position detection patterns and calculating the data bit width of the QR code pattern;

judging whether the two position detection patterns are in an adjacent positional relation or a diagonal positional relation according to the geometrical relation between the boundaries and the vertexes of the two position detection patterns;

searching out a location pattern between the two position detection patterns with the positional relation determined according to the positional relation of the two position detection patterns and the position characteristic and the black and white pattern characteristic of the location pattern;

determining the region where the QR code pattern is located according to the two position detection patterns and the location pattern;

partitioning the region where the QR code pattern is located with grids according to the two position detection patterns, the location pattern and the data bit width of the QR code pattern;

decoding the QR code pattern partitioned with grids.

Furthermore, the decoding method for the QR code with one damaged position detection pattern comprises the following steps:

not decoding the received image containing the QR code pattern if only one position detection pattern is searched out;

not adopting the method mentioned above to decode the received image containing the QR code if three position detection patterns are searched out.

From the above description, if only one position detection pattern is searched out, it indicates that the received image containing the QR code pattern is severely damaged and thus is not decoded; and if three position detection patterns are searched out, the region where the QR code pattern is located can be obtained directly according to the three position detection patterns without searching for the location pattern, and thus the method is reasonable.

Furthermore, the data bit width of the QR code pattern is calculated, specifically, the side width of the position detection patterns can be worked out according to the linear equations of the boundaries of the two position detection patterns and the vertex coordinates of the two position detection patterns;

the quotient obtained by dividing the side width of the position detection patterns by seven is regarded as the data bit width of the QR code pattern.

From the above description, the data bit width of the QR code pattern is calculated by means of the characteristic that the side width of the position detection patterns includes seven data bit widths, the side width of the position detection patterns can be directly worked out through the linear equations of the boundaries of the position detection patterns and the fixed-point coordinates of the position detection patterns according to geometrical relations, and thus the method is reasonable.

Furthermore, whether the two position detection patterns are in an adjacent positional relation or a diagonal positional relation is judged according to the geometrical relation between the boundaries and the vertexes of the two position detection patterns, specifically, one vertex of one position detection pattern is regarded as the first vertex, and the angular point position of the first vertex on the position detection pattern and the linear equations of the first pair of boundaries which intersect with the first vertex and are perpendicular to each other are recorded;

the vertex, having the same angular point position with the first vertex, of the other position detection pattern is regarded as the second vertex, and the linear equations of the second pair of boundaries which intersect with the second vertex and are perpendicular to each other are recorded;

the intersection point of the second pair of boundaries and the intersection point of the first pair of boundaries are calculated;

a point distance threshold is preset, and the distances from the two intersection points to the first vertex or the second vertex are calculated, so that two distance values are obtained;

if one of the two distance values is smaller than or equal to the point distance threshold, it is judged that the two position detection patterns are in the adjacent positional relation, otherwise, it is judged that the two position detection patterns are in diagonal positional relation.

From the above description, the vertex positions, corresponding to the intersection point of the two straight lines of the first pair of boundaries and the intersection point of the two straight lines of the second pair of boundaries, on the position detection patterns are identical; and the two straight lines corresponding to the first pair of boundaries are perpendicular to each other, and the two straight lines corresponding to the second pair of boundaries are also perpendicular to each other, so that the two slopes of the two straight lines corresponding to the first pair of boundaries are identical with the two slopes of the two straight lines corresponding to the second pair of boundaries, and the first pair of boundaries and the second pair of boundaries have only two intersection points. If the two position detection patterns are in the adjacent positional relation, the intersection point of the first pair of boundaries and the intersection point of the second pair of boundaries are the first vertex and the second vertex separately. For a brief judgment process, the distances from the two intersection points to the first vertex or the second vertex are calculated, it can be judged that the two position detection patterns are in the adjacent positional relation as long as one of the two distance values is smaller than the point distance threshold, one of the two distance values is equal to zero under the ideal condition, and for eliminating errors of boundary values and vertex values and errors generated in the calculation process, the point distance threshold is set. If the two position detection patterns are in the diagonal positional relation, the distances from the two intersection points to any vertex are greater than the width of the position detection patterns, and thus the maximum point distance threshold can be set as the width value of the position detection patterns. The method is reasonable, calculation is easy and convenient, and QR code recognition efficiency and accuracy are improved.

Furthermore, whether the two position detection patterns are in the adjacent positional relation or the diagonal positional relation is judged according to the geometrical relation between the boundaries and the vertexes of the two position detection patterns, specifically, the linear equations of the first pair of boundaries, perpendicular to each other, of one position detection patter are obtained;

the linear equations of the four boundaries of the other position detection pattern are obtained;

a linear distance threshold is preset, and the distances from every two parallel boundaries of the four boundaries of the other position detection pattern to the boundary, in parallel with the two parallel boundaries, in the first pair of boundaries are calculated separately, so that four distance values are obtained;

if one of the four distance values is smaller than or equal to the linear distance threshold, it is judged that the two position detection patterns are in the adjacent positional relation, otherwise, it is judged that the two position detection patterns are in the diagonal positional relation.

From the above description, two of the four boundaries of the other position detection pattern are in parallel with each other as well as in parallel with one of the first pair of boundaries, and the distances from every two parallel boundaries of the four boundaries of the other position detection pattern to the boundary, in parallel with the two parallel boundaries, in the first pair of boundaries separately, so that the four distance values are obtained. If the two position detection patterns are in the adjacent positional relation, one of the four distance values is smaller than the linear distance threshold, one of the four distance values is equal to zero under the ideal condition, and for eliminating errors of the boundary values and errors generated in the calculation process, the linear distance threshold is set. If the two position detection patterns are in the diagonal positional relation, the four distance values are all greater than the width of the position detection patterns, and thus the maximum linear distance threshold can be set as the width value of the position detection patterns. Therefore, the method is reasonable, calculation is easy and convenient, and QR code recognition efficiency and accuracy are improved.

Figure 5:
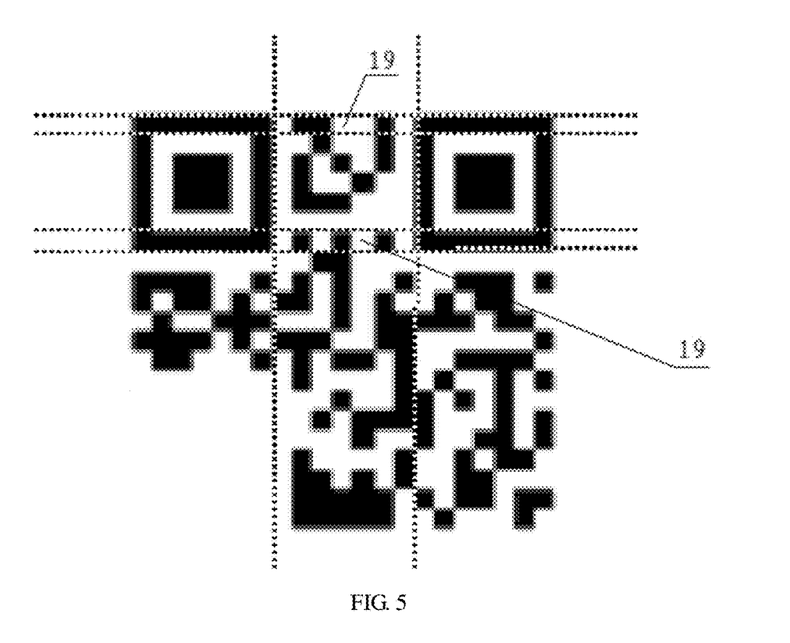
FIG. 5 is a structural diagram of possible location pattern regions when the two position detection patterns are in an adjacent positional relation in the first embodiment of the invention.

Furthermore, if the two position detection patterns are in the adjacent positional relation, a location pattern between the two position detection patterns with the positional relation determined is searched out according to the position characteristic and the black and white pattern characteristic of the location pattern, specifically, the two position detection patterns are in the adjacent positional relation;

according to the boundaries of the two position detection patterns and the data bit width of the QR code pattern, two possible location pattern regions 19 which overlap with the edges of the two position detection patterns and occupy one data bit width are marked out in the region between the two position detection patterns;

the number of continuous black pixel points and the number of continuous white pixel points in each of the two possible location pattern regions 19 are recorded separately, and two possible location pattern scales are obtained;

a number value similarity threshold is preset, and the possible location pattern scale meeting the condition that the difference between any two number values is smaller than the number value similarity threshold is screened out from the two possible location pattern scales to serve as the scale of the location pattern region;

a pattern corresponding to the location pattern region is the location pattern.

From the above description, if the two position detection patterns are in the adjacent positional relation, one location patter exists in the region between the two position detection patterns. The location pattern is located in the region between the two position detection patterns, the length of the location pattern is equal to the distance between the opposite boundaries of the two position detection patterns, and the width of the location pattern is equal to one data bit width of the QR code pattern. If the number of the continuous black points on the location pattern approximates to the number of the continuous white points on the location pattern and the continuous black points and the continuous white points occupy one data bit width, the two possible location patterns are right located between the two position detection patterns and overlap with the edges of the two position detection patterns by one data bit width, and whether the two possible location patterns are the location pattern or not can be judged only by judging whether the difference between the number of the continuous black points and the number of the continuous white points is within the range of the preset number value similarity threshold or not. Therefore, through the method, data calculation is direct, location pattern recognition efficiency is high, and errors are low.

Furthermore, if the two position detection patterns are in the adjacent positional relation, the received QR code pattern is partitioned with grids according to the two position detection patterns, the location pattern and the data bit width of the QR code pattern, specifically, the two position detection patterns are in the adjacent positional relation;

the region where the QR code pattern is located is determined according to the positions of two position detection patterns and the position of the location pattern;

the direction perpendicular to the length direction of the location pattern is regarded as the first direction, and the direction parallel to the length direction of the location pattern is regarded as the second direction;

the location pattern region is partitioned in the first direction according to boundaries between black pixel points and white pixel points in the location pattern;

the two position detection patterns are partitioned in the first direction according to the data bit width;

the region where the QR code pattern is located is partitioned in the second direction according to the data bit width.

From the above description, the region where the location pattern is located is partitioned in the first direction according to the boundaries between the black pixel points and the white pixel points in the location pattern, and the regions where the position detection patterns are located are partitioned according to the data bit width. As it has already been known that the two position detection patterns are adjacent and the location pattern between the two position detection patterns has already been searched out, it can be figured out that the QR code pattern is located on one side of the searched-out location pattern, and the width, in the first direction, of the QR code pattern is equal to the width, in the second direction, of the QR code pattern, namely the region where the QR code pattern located is a square region. The width, in the second direction, of the QR code pattern is the distance between the outermost opposite boundaries of the two position detection patterns, as the distance can be worked out, the width, in the first direction, of the QR code pattern can be worked out, and then the QR code pattern is partitioned in the first direction according to data bit width. Through the method, the QR code pattern can be partitioned accurately, and the decoding error is low.

Figure 8:
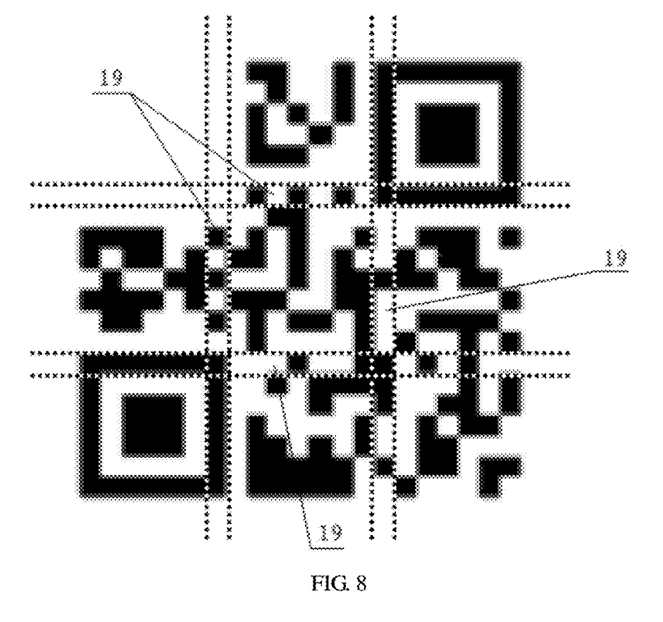
FIG. 8 is a structural diagram of possible location pattern regions when the two position detection patterns are in a diagonal positional relation in the second embodiment of the invention.

Furthermore, if the two position detection patterns are in the diagonal positional relation, location patterns between the two position detection patterns with the positional relation determined are searched out according to the position characteristic and the black and white pattern characteristic of the location patterns, specifically, the two position detection patterns are in the diagonal positional relation;

four possible location pattern regions 19 which overlap with the inner edges of the two position detection patterns and occupy one data bit width are marked out in the region between the two position detection patterns according to the boundaries of the two position detection patterns and the data bit width of the QR code pattern;

the number of continuous black pixel points and the number of continuous white pixel points in each of the four possible location pattern regions 19 are recorded separately, and four possible location pattern scales are obtained;

a number value similarity threshold is preset, and the two possible location pattern scales meeting the condition that the difference of any two number values is smaller than the number value similarity threshold and perpendicular to each other are screened out from the four possible location pattern scales to serve as the scales of two location pattern regions;

patterns corresponding to the two location pattern regions are the location patterns.

From the above description, if the two position detection patterns are in the diagonal positional relation, four possible location pattern regions 19 exist, and the four possible location pattern regions 19 are located on two perpendicular inner edges the two position detection patterns and occupy one data bit width. Two location patterns searched out after the four possible location patterns are marked off have the characteristic of being perpendicular to each other, and if the two searched-out location patterns are not perpendicular to each other, it indicates that searching for the location patterns fails, and the QR code pattern is not decoded. The number of the continuous black points on each location pattern approximates to the number of continuous white points on the location pattern, and the continuous black points and the continuous black points occupy one data bit width, therefore, whether the four possible location patterns are location patterns or not can be judged only by judging whether the difference between the number of the continuous black points and the number of the continuous white points is within the range of the preset threshold or not, and through the method, data calculation is direct. The two location pattern regions are perpendicular to each other in the length direction or in the width direction, and the intersection corner of the two perpendicular location patterns is the region where the damaged position detection pattern is located. Through the method for recognizing the regions of the two location patterns, location pattern recognition efficiency is high, and errors are low.

Furthermore, if the two position detection patterns are in the diagonal positional relation, the received QR code image is partitioned with grids according to the two position detection patterns, the two location patterns and the data bit width of the QR code pattern, specifically, the two position detection patterns are in the diagonal positional relation;

the region where the QR code pattern is located is determined according to the positions of the two position detection patterns and the positions of the two location patterns;

each location pattern region is partitioned in the direction perpendicular to the length direction of the location pattern region according to the boundaries between the black pixel points and the white pixel points in the location pattern;

the two position detection patterns are partitioned in the two direction parallel to the four boundaries according to the data bit width.

From the above description, the region where the QR code pattern is located is a square region, each location pattern region is partitioned in the direction perpendicular to the length direction of the location pattern according to the boundaries between the black pixel points and the white pixel points in the location pattern, then the two position detection patterns are partitioned according to the data bit width, and thus grid partition of the QR code pattern is completed. The grid partition method is accurate, and correct decoding of the QR code pattern is effectively ensured.

As is shown in FIGS. 1-7, as for the first embodiment of the invention:

A received image containing a QR code pattern is binarized, and position detection patterns are searched for.

The QR code pattern is decoded through the following method if two position detection patterns are searched out.

The linear equations of the boundaries of the two position detection patterns and the vertex coordinates of the two position detection patterns are recorded, and the data bit width W of the QR code pattern is calculated, specifically, the side width of the position detection patterns can be worked out according to the linear equations of the boundaries of the two position detection patterns and the vertex coordinates of the two position detection patterns;

the quotient obtained by dividing the side width of the position detection patterns by seven is regarded as the data bit width W of the QR code pattern.

Figure 3:
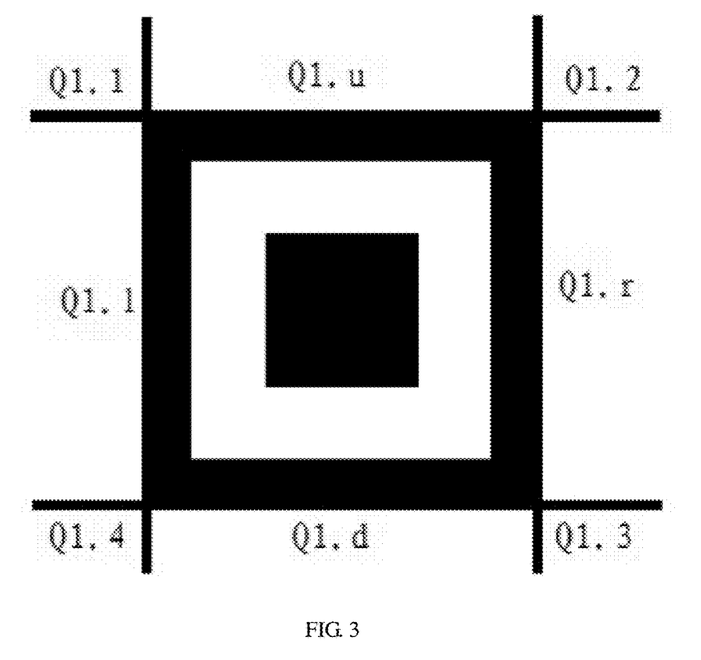
FIG. 3 is a structural diagram of the vertexes and boundaries of one position detection pattern Q1 of two position detection patterns of the QR code in the first embodiment and the second embodiment of the invention.
Figure 4:
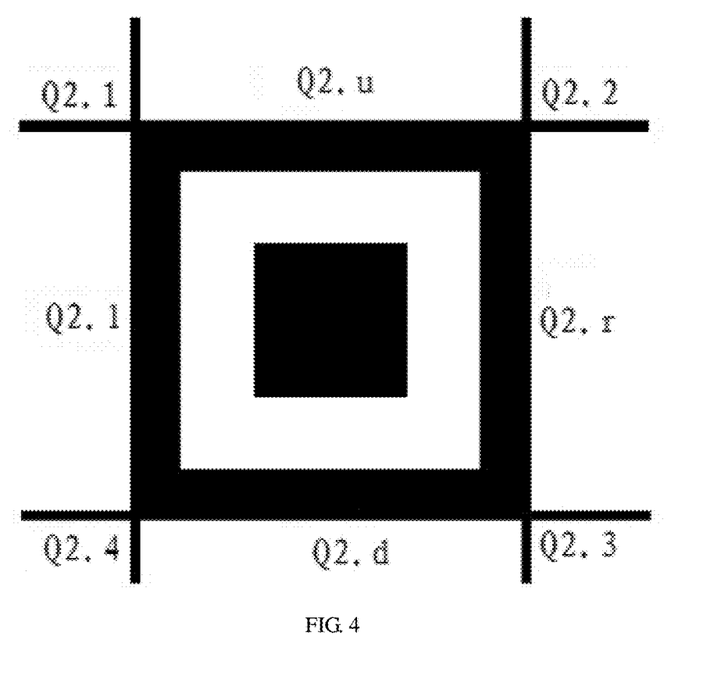
FIG. 4 is a structural diagram of the vertexes and boundaries of the other position detection pattern Q2 of the two position detection patterns of the QR codes in the first embodiment and the second embodiment of the invention.

Whether the two position detection patterns are in an adjacent positional relation or a diagonal positional relation is judged according to the geometrical relation between the boundaries and the vertexes of the two position detection patterns, specifically, as is shown in FIG. 3 and FIG. 4, the two position detection patterns are marked as Q1 and Q2 separately; the vertexes of the position detection pattern Q1 are marked as Q1.1, Q1.2, Q1.3 and Q1.4 separately, and the vertexes of the position detection pattern Q2 are marked as Q2.1, Q2.2, Q2.3 and Q2.4 separately; the four boundaries of the position detection pattern Q1 are marked as Q1.1, Q1.$u$, Q1.$r$ and Q1.$d$ separately, and the four boundaries of the position detection pattern Q2 are marked as Q2.1, Q2.$u$, Q2.$r$ and Q2.$d$ separately;

the vertex Q1.2 of the position detection pattern Q1 is regarded as the first vertex, and the angular point position of the first vertex Q1.2 on the position detection pattern Q1 and the linear equations of the first pair of boundaries Q1.$u$ and Q1.$r$ which intersect with the first vertex Q1.2 and are perpendicular to each other are recorded;

the vertex, having the same angular point position with the first vertex Q1.2, of the position detection pattern Q2 is regarded as the second vertex Q2.2, and the linear equations of the second pair of boundaries Q2.$u$ and Q2.$r$ which intersect with the second vertex Q2.2 and are perpendicular to each other are recorded;

the intersection point of the second pair of boundaries Q2.$u$ and Q2.$r$ and the intersection point of the first pair of boundaries Q1.$u$ and Q1.$r$ are calculated;

the point distance threshold is set as W, and the distances from the two intersection points to the first vertex or the second vertex are calculated, so that two distance values are obtained; actually, the point distance threshold can be set as any value which is greater than or equal to zero and smaller than or equal to W;

if one of the two distance values is smaller than or equal to the point distance threshold W, it is judged that the two position detection patterns are in the adjacent positional relation, otherwise, it is judged that the two position detection patterns are in the diagonal positional relation.

Suppose that the two position detection patterns are in the adjacent positional relation, the QR code pattern is subsequently decoded through the following method:

As is shown in FIG. 5, if the two position detection patterns are in the adjacent positional relation, a location pattern located between the two position detection patterns with the positional relation determined is searched out according to the positional relation of the two position detection patterns and the position characteristic and black and white pattern characteristic of the location pattern, specifically, two possible location pattern regions 19 which overlap with the edges of the two position detection patterns and occupy one data bit width are marked out in the region between the two position detection patterns according to the boundaries of the two position detection patterns and the data bit width of the QR code pattern;

the number of continuous black pixel points and the number of continuous white pixel points in each of the two possible location pattern regions 19 are recoded separately, so that two possible location pattern scales are obtained;

a number value similarity threshold is preset, and the possible location pattern scale meeting the condition that the difference between any two number values is smaller than the number value similarity threshold is screened out from the two possible location pattern scales to serve as the scale of the location pattern region;

a pattern corresponding to the location pattern region is the location pattern.

The region where the QR code pattern is located is determined according to the two position detection patterns and the location pattern.

Figure 6:
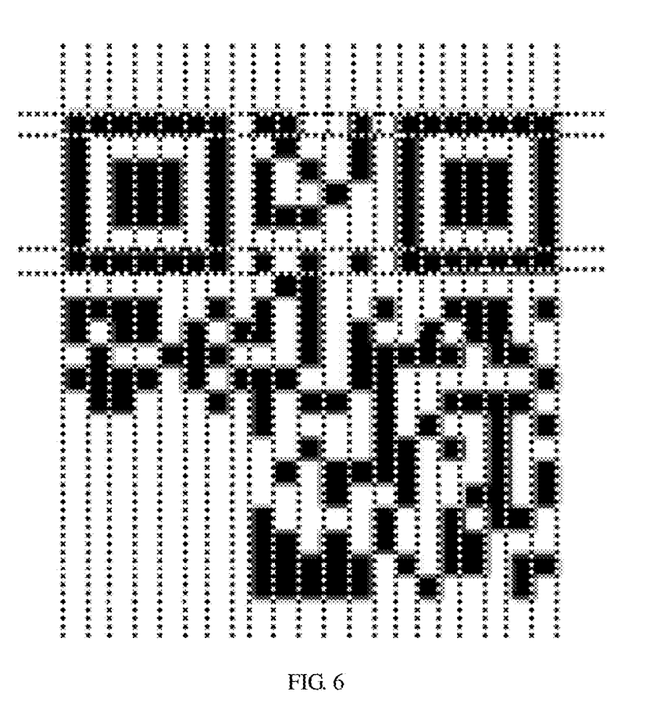
FIG. 6 is a structural diagram of the QR code pattern after being partitioned in the first direction when the two position detection patterns are in the adjacent positional relation in the first embodiment of the invention.
Figure 7:
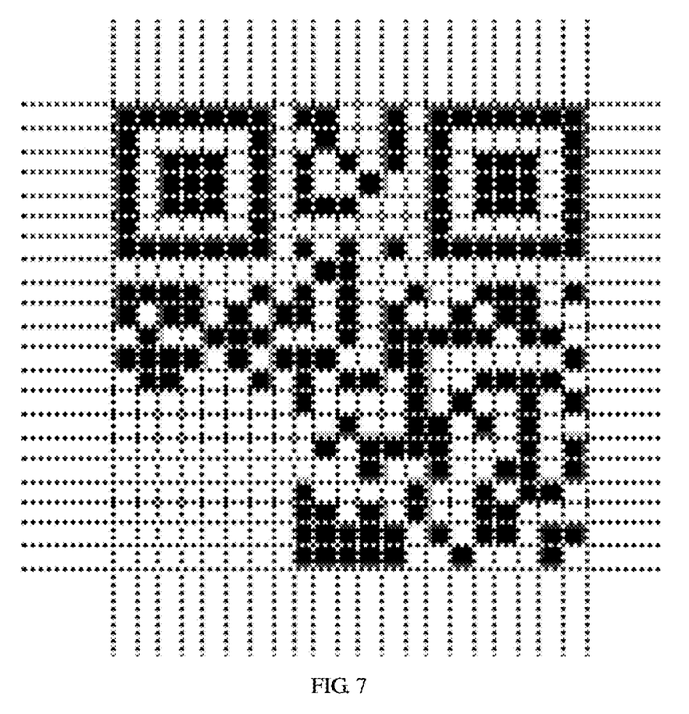
FIG. 7 is a structural diagram of the QR code pattern after being partitioned in the first direction and then partitioned in the second direction when the two position detection patterns are in the adjacent positional relation in the first embodiment of the invention.

The region where the QR code pattern is located is partitioned with grids according to the two position detection patterns, the location pattern and the data bit width of the QR code pattern, specifically, the region where the QR code pattern is located is determined according to the positions of the two position detection pattern and the position of the location pattern;

the direction perpendicular to the length direction of the location pattern is regarded as the first direction, and the direction parallel to the length direction of the location pattern is regarded as the second direction;

as is shown in FIG. 6, the location pattern region is partitioned in the first direction according to the boundaries between the black pixel points and the white pixel points in the location pattern;

the two position detection patterns are partitioned in the first direction according to the data bit width;

as is shown in FIG. 7, the region where the QR code pattern is located is partitioned in the second direction according to the data bit width.

The QR code pattern partitioned with grids is decoded.

As is shown in FIGS. 1-4, FIG. 8 and FIG. 9, as for the second embodiment of the invention:

Whether the two position detection patterns are in the adjacent positional relation or the diagonal positional relation is judged through the method mentioned in the first embodiment. Suppose that the two position detection patterns are in the diagonal positional relation, the QR code pattern is subsequently decoded through the following method:

If the two position detection patterns are in the diagonal positional relation, location patterns located between the two position detection patterns with the positional relation determined are searched out according to the positional relation of the two position detection patterns and the position characteristic and black and white pattern characteristic of the location pattern, specifically, as is shown in FIG. 8, four possible location pattern regions 19 which overlap with the inner edges of the two position detection patterns and occupy one data bit width are marked out in the region between the two position detection patterns according to the boundaries of the two position detection patterns and the data bit width of the QR code pattern;

the number of continuous black pixel points and the number of continuous white pixel points in each of the four possible location pattern regions 19 are recorded separately, and four possible location pattern scales are obtained;

a number value similarity threshold is preset, and the two possible location pattern scales meeting the condition that the difference of any two number values is smaller than the number value similarity threshold and perpendicular to each other are screened out from the four possible location pattern scales to serve as the scales of two location pattern regions;

patterns corresponding to the two location pattern regions is the location patterns.

The region where the QR code pattern is located is determined according to the two position detection patterns and the two location patterns.

Figure 9:
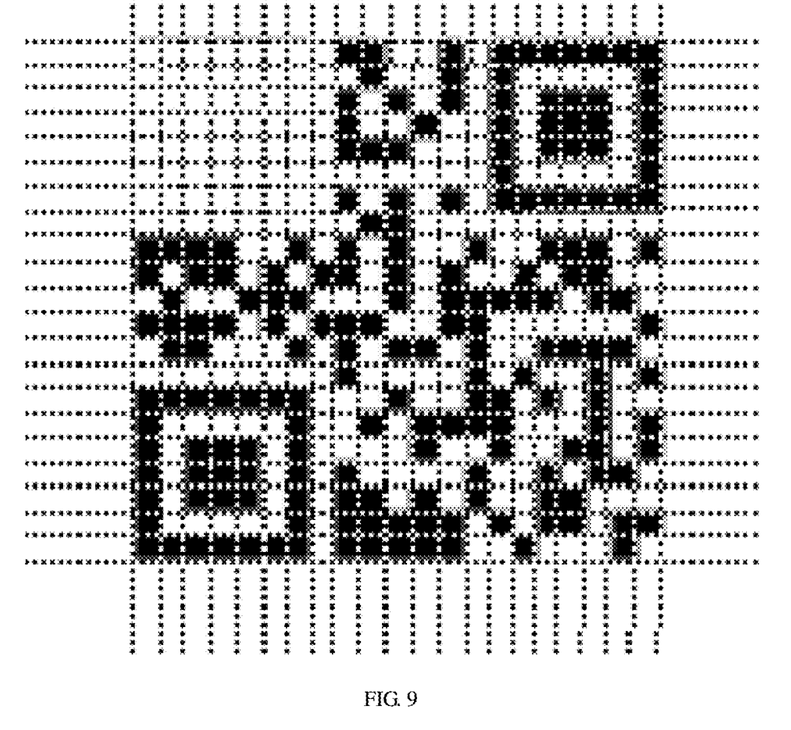
FIG. 9 is a structural diagram of the QR code pattern after being partitioned when the two position detection patterns are in the diagonal positional relation in the second embodiment of the invention.

As is shown in FIG. 9, the region where the QR code pattern is located is partitioned with grids according to the two position detection patterns, the two location patterns and the data bit width of the QR code pattern, specifically, the region where the QR code pattern is located is determined according to the positions of the two position detection patterns and the positions of the two location patterns;

each location pattern region is partitioned in the direction perpendicular to the length direction of the location pattern region according to the boundaries between the black pixel points and the white pixel points in the location pattern;

the two position detection patterns are partitioned in the two directions parallel to the four boundaries according to data bit width.

The QR code partitioned with grids is decoded.

Figure 10:
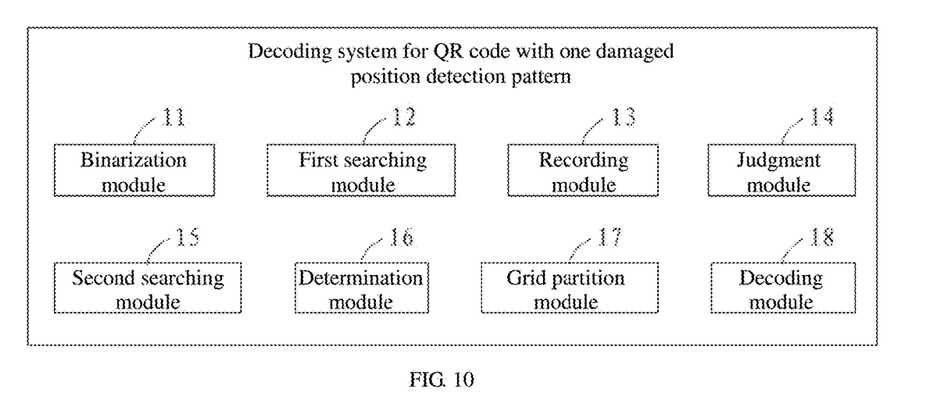
FIG. 10 is a system block diagram of a decoding system for a QR code with one damaged position detection pattern in the third embodiment of the invention.

As is shown in FIG. 10, a decoding system for a QR code with one damaged position detection pattern comprises a binarization module 11, a first searching module 12, a recording module 13, a judgment module 14, a second searching module 15, a determination module 16, a grid partition module 17 and a decoding module 18, wherein, the binarization module 11 is used for binarizing a received image containing a QR code pattern;

the first searching module 12 is used for searching the received image containing the QR code pattern for position detection patterns;

the recording module 13 is used for recording the linear equations of the boundaries of the two position detection patterns and the vertex coordinates of the two position detection patterns and calculating the data bit width of the QR code pattern;

the judgment module 14 is used for judging whether the two position detection patterns are in an adjacent positional relation or a diagonal positional relation according to the geometrical relation between the boundaries and the vertexes of the two position detection patterns;

the second searching module 15 is used for searching out a location pattern between the two position detection patterns with the positional relation determined according to the positional relation of the two position detection patterns and the position characteristic and the black and white pattern characteristic of the location pattern;

the determination module 16 is used for determining the region where the QR code pattern is located according to the two position detection patterns and the location pattern;

the grid partition module 17 is used for partitioning the region where the QR code pattern is located with grids according to the two position detection patterns, the location pattern and the data bit width of the QR code pattern;

the decoding module 18 is used for decoding the QR code pattern partitioned with grids.

As is shown in FIG. 10, as for the third embodiment of the invention:

A decoding system for a QR code with one damaged position detection pattern comprises a binarization module 11, a first searching module 12, a recording module 13, a judgment module 14, a second searching module 15, a determination module 16, a grid partition module 17 and a decoding module 18, wherein, the binarization module 11 is used for binarizing a received image containing a QR code pattern;

the first searching module 12 is used for searching the received image containing the QR code pattern for position detection patterns;

the recording module 13 is used for recording the linear equations of the boundaries of the two position detection patterns and the vertex coordinates of the two position detection patterns and calculating the data bit width of the QR code pattern;

the judgment module 14 is used for judging whether the two position detection patterns are in an adjacent positional relation or a diagonal positional relation according to the geometrical relation between the boundaries and the vertexes of the two position detection patterns;

the second searching module 15 is used for searching out a location pattern between the two position detection patterns with the positional relation determined according to the positional relation of the two position detection patterns and the position characteristic and the black and white pattern characteristic of the location pattern;

the determination module 16 is used for determining the region where the QR code pattern is located according to the two position detection patterns and the location pattern;

the grid partition module 17 is used for partitioning the region where the QR code pattern is located with grids according to the two position detection patterns, the location pattern and the data bit width of the QR code pattern;

the decoding module 18 is used for decoding the QR code pattern partitioned with grids.

In conclusion, for the decoding method and system for the QR code with one damaged position detection pattern of the invention, the positional relation of the two position detection patterns of the QR code with only two complete position detection patterns is judged firstly according to the geometrical relation, then the location pattern is searched out and the region where the QR code pattern is located is determined, and finally, the QR code pattern is decoded after the region where the QR code pattern is located is partitioned with grids, so that by adoption of the method, redundant calculation is avoided, the characteristics of the position detection patterns and the location pattern are fully used, QR code pattern recognition efficiency is high, and errors are low.

What is claimed is:

1. A decoding system for a QR code with one damaged position detection pattern, comprising a binarization module, a first searching module, a recording module, a judgment module, a second searching module, a determination module, a grid partition module and a decoding module, wherein, the binarization module is used for binarizing a received image containing a QR code pattern;

the first searching module is used for searching the received image containing the QR code pattern for position detection patterns;

the recording module is used for recording linear equations of the boundaries of the two position detection patterns and the vertex coordinates of the two position detection patterns and calculating the data bit width of the QR code pattern;

the judgment module is used for judging whether the two position detection patterns are in an adjacent positional relation or a diagonal positional relation according to the geometrical relation between the boundaries and the vertexes of the two position detection patterns;

the second searching module is used for searching out a location pattern between the two position detection patterns with the positional relation determined according to the positional relation of the two position detection patterns and a position characteristic and a black and white pattern characteristic of the location pattern;

the determination module is used for determining the region where the QR code pattern is located according to the two position detection patterns and the location pattern;

the grid partition module is used for partitioning the region where the QR code pattern is located with grids according to the positional relation of the two position detection patterns, the location pattern and the data bit width of the QR code pattern; and the decoding module is used for decoding the QR code pattern partitioned with grids.

2. The decoding system for the QR code with one damaged position detection pattern according to claim 1, characterized in that the data bit width of the QR code pattern is calculated, specifically, the side width of the position detection patterns are worked out according to the linear equations of the boundaries of the two position detection patterns and the vertex coordinates of the two position detection patterns;

the quotient obtained by dividing the side width of the position detection patterns by seven is regarded as the data bit width of the QR code pattern.

3. The decoding system for the QR code with one damaged position detection pattern according to claim 1, characterized in that whether the two position detection patterns are in the adjacent positional relation or the diagonal positional relation is judged according to the geometrical relation between the boundaries and the vertexes of the two position detection patterns, specifically, one vertex of one position detection pattern is regarded the first vertex, and the angular point position of the first vertex on the position detection pattern and the linear equations of the first pair of boundaries which intersect with the first vertex and are perpendicular to each other are recorded;

the vertex, having the same angular point position with the first vertex, of the other position detection pattern is regarded as the second vertex, and the linear equations of the second pair of boundaries which intersect with the second vertex and are perpendicular to each other are recorded;

the intersection point of the second pair of boundaries and the intersection point of the first pair of boundaries are calculated;

a point distance threshold is preset, and the distances from the two intersection points to the first vertex or the second vertex are calculated, so that two distance values are obtained;

if one of the two distance values is smaller than or equal to the point distance threshold, it is judged that the two position detection patterns are in the adjacent positional relation, otherwise, it is judged that the two position detection patterns are in diagonal positional relation.

4. The decoding system for the QR code with one damaged position detection pattern according to claim 1, characterized in that whether the two position detection patterns are in the adjacent positional relation or the diagonal positional relation is judged according to the geometrical relation between the boundaries and the vertexes of the two position detection patterns, specifically, the linear equations of the first pair of boundaries, perpendicular to each other, of one position detection pattern are obtained;

the linear equations of the four boundaries of the other position detection pattern are obtained;

a linear distance threshold is preset, and the distances from every two parallel boundaries of the four boundaries of the other position detection pattern to the boundary, in parallel with the two parallel boundaries, in the first pair of boundaries are calculated separately, so that four distance values are obtained; if one of the four distance values is smaller than or equal to the linear distance threshold, it is judged that the two position detection patterns are in the adjacent positional relation, otherwise, it is judged that the two position detection patterns are in the diagonal positional relation.

5. The decoding system for the QR code with one damaged position detection pattern according to claim 1, characterized in that if the two position detection patterns are in the adjacent positional relation, a location pattern between the two position detection patterns with the positional relation determined is searched out according to the position characteristic and the black and white pattern characteristic of the location pattern, specifically, the two position detection patterns are in the adjacent positional relation;

according to the boundaries of the two position detection patterns and the data bit width of the QR code pattern, two possible location pattern regions which overlap with the edges of the two position detection patterns and occupy one data bit width are marked out in the region between the two position detection patterns;

the number of continuous black pixel points and the number of continuous white pixel points in each of the two possible location pattern regions are recorded separately, and two possible location pattern scales are obtained;

a number value similarity threshold is preset, and the possible location pattern scale meeting the condition that the difference between any two number values is smaller than the number value similarity threshold is screened out from the two possible location pattern scales to serve as the scale of the location pattern region;

a pattern corresponding to the location pattern region is the location pattern.

6. The decoding system for the QR code with one damaged position detection pattern according to claim 5, characterized in that if the two position detection patterns are in the adjacent positional relation, the received QR code pattern is partitioned with grids according to the two position detection patterns, the location pattern and the data bit width of the QR code pattern, specifically, the two position detection patterns are in the adjacent positional relation;

the region where the QR code pattern is located is determined according to the positions of two position detection patterns and the position of the location pattern;

the direction perpendicular to the length direction of the location pattern is regarded as the first direction, and the direction parallel to the length direction of the location pattern is regarded as the second direction;

the location pattern region is partitioned in the first direction according to boundaries between black pixel points and white pixel points in the location pattern;

the two position detection patterns are partitioned in the first direction according to the data bit width;

the region where the QR code pattern is located is partitioned in the second direction according to the data bit width.

7. The decoding system for the QR code with one damaged position detection pattern according to claim 1, characterized in that if the two position detection patterns are in the diagonal positional relation, location patterns between the two position detection patterns with the positional relation determined are searched out according to the position characteristic and the black and white pattern characteristic of the location patterns, specifically, the two position detection patterns are in the diagonal positional relation;

according to the boundaries of the two position detection patterns and the data bit width of the QR code pattern, four possible location pattern regions which overlap with the inner edges of the two position detection patterns and occupy one data bit width are marked out in the region between the two position detection patterns;

the number of continuous black pixel points and the number of continuous white pixel points in each of the four possible location pattern regions are recorded separately, and four possible location pattern scales are obtained;

a number value similarity threshold is preset, and the two possible location pattern scales meeting the condition that the difference of any two number values is smaller than the number value similarity threshold and perpendicular to each other are screened out from the four possible location pattern scales to serve as the scales of two location pattern regions;

patterns corresponding to the two location pattern regions are the location patterns.

8. The decoding system for the QR code with one damaged position detection pattern according to claim 7, characterized in that if the two position detection patterns are in the diagonal positional relation, the received QR code image is partitioned with grids according to the two position detection patterns, the two location patterns and the data bit width of the QR code pattern, specifically, the two position detection patterns are in the diagonal positional relation;

the region where the QR code pattern is located is determined according to the positions of the two position detection patterns and the positions of the two location patterns;

each location pattern region is partitioned in the direction perpendicular to the length direction of the location pattern region according to the boundaries between the black pixel points and the white pixel points in the location pattern;

the two position detection patterns are partitioned in the two direction parallel to the four boundaries according to the data bit width.

* * * * *